United States Patent [19]

Hirao et al.

[11] Patent Number: 5,124,101
[45] Date of Patent: Jun. 23, 1992

[54] METHOD FOR MANUFACTURING FINE POROUS MEMBER

[75] Inventors: Shozo Hirao, Osaka; Masaru Yokoyama, Kadoma; Takashi Kishimoto, Kadoma; Kouichi Takahama, Kadoma; Hiroshi Yokogawa, Kadoma, all of Japan

[73] Assignee: Matsushita Electric Works, Ltd., Osaka, Japan

[21] Appl. No.: 540,690

[22] Filed: Jun. 20, 1990

Related U.S. Application Data

[63] Continuation-in-part of Ser. No. 297,196, filed as PCT/JP88/00305, Mar. 25, 1988, abandoned.

[30] Foreign Application Priority Data

Mar. 26, 1987 [JP] Japan .................................. 62-72453
Apr. 24, 1987 [JP] Japan .................................. 62-102312
Apr. 24, 1987 [JP] Japan .................................. 62-102337
Jan. 23, 1988 [JP] Japan .................................. 63-12826

[51] Int. Cl.⁵ .................................. B29C 13/00; B29C 43/02
[52] U.S. Cl. .................................. 264/82; 252/62; 264/130; 264/135; 264/319; 264/DIG. 54; 264/122; 264/125; 427/220; 427/255; 427/255.6; 428/405
[58] Field of Search .................................. 264/109, 110, 118, 122, 264/134, 332, 130, 125, DIG. 54, 82, 135, 319; 252/62, 70; 428/405, 412, 413, 414, 417; 427/215, 220, 387, 255, 255.6

[56] References Cited

U.S. PATENT DOCUMENTS

| | | | |
|---|---|---|---|
| 3,055,831 | 9/1962 | Barnett et al. | 252/62 |
| 3,085,905 | 4/1963 | Prevot et al. | 427/255 |
| 3,169,927 | 2/1965 | Matsch . | |
| 4,183,980 | 1/1980 | Nielsen | 427/215 |
| 4,212,925 | 7/1980 | Kratel et al. | 252/62 |
| 4,645,691 | 2/1987 | Ona et al. | 427/387 |

FOREIGN PATENT DOCUMENTS

| | | | |
|---|---|---|---|
| 251176 | 1/1988 | European Pat. Off. | 427/220 |
| 2754517 | 6/1978 | Fed. Rep. of Germany | 427/387 |
| 655677 | 8/1951 | United Kingdom | 427/220 |

Primary Examiner—Jeffery Thurlow
Assistant Examiner—Mathieu Vargot
Attorney, Agent, or Firm—Burns, Doane, Swecker & Mathis

[57] ABSTRACT

A method for manufacturing a fine porous member provides that vacant space within the porous member is sufficiently finely small such that the thermal conductivity of the member is lower than that of stationary air. In the method, a fine particle powder together with an ultrafine particle powder preliminarily subjected to a surface treatment for prevention of cohesiveness and employed at least as a part of the fine particle powder, are molded into the fine porous member, whereby the vacant space between the respective particles are made finely small to a remarkable extent and the porous member is provided as highly adapted to be used as a heat insulator.

8 Claims, 2 Drawing Sheets

METHOD FOR MANUFACTURING FINE POROUS MEMBER

CROSS-REFERENCE TO RELATED APPLICATION

This application is a continuation-in-part of Application Ser. No. 297,196 filed as PCT/JP88/00305, Mar. 25, 1988, now abandoned.

BACKGROUND OF THE INVENTION

1. Field of the Invention

This invention relates generally to the field of insulating materials and more specifically to a method for manufacturing a fine porous member having a thermal conductivity which is far lower than that of stationary air under atmospheric pressure and which also is only slightly variable over time. The fine porous member of the invention can be effectively utilized in various applications as a heat insulator because of the low thermal conductivity.

2. Description of the Prior Art

Generally, heat insulators have a thermal conductivity in a range of about 0.03 to 0.05 kcal/mhr°C. which is higher than the thermal conductivity of stationary air, namely, from 0.02 to 0.024 kcal/mhr°C. In many applications the insulation provided by such insulators is insufficient, and attempts have been made to obtain a heat insulator having a thermal conductivity lower than that of stationary air.

In particular, in U.S. Pat. Nos. 3,869,334 and 4,564,547 to J. T. Hughes et al, there has been suggested heat insulators in which a fine porous member is utilized. More specifically, the former patent provides a technique of forming a panel of an integral insulator of a fine porous silica aerogel fixed with a glass fiber cloth under pressure, while the latter patent shows a heat-insulator manufacturing method according to which vacant space in a honeycomb structure of a metallic or organic material, woven textile, paper or the like is attempted to be reduced by charging such fine material as silica aerogel into the vacant space. With these heat insulators, it is possible to lower thermal conductivity to be about 0.02 kcal/mhr°C. under atmospheric pressure so that the thermal conductivity can be remarkably improved as compared with general heat insulators.

The thermal conductivity of these known heat insulators under atmospheric pressure has been, however, still substantially at the level of the conductivity of stationary air and, accordingly, the heat insulators have been required to be made considerably lower in thermal conductivity under the atmospheric pressure than that of the stationary air, in order that the heat insulating effect can be well elevated. In this respect, the known heat insulators have been unable to attain a sufficiently satisfactory heat insulating effect. Further, the heat insulator adsorbs aerial vapor when left in the atmosphere, so that heat insulating properties deteriorate with time.

Further, there have been known heat insulators having low thermal conductivity such as a porous member of calcium silicate made in a vacuumed state of about 0.1 Torr, a foamed and crushed pearlite also in a vacuumed state of about 0.1 Torr as has been disclosed in Japanese Patent Laid-Open Publication No. 60-33479, and the like, but they have been defective due to the necessity of being kept in the vacuumed state, and due to higher manufacturing costs. In utilizing them as the heat insulator, they have to be considerably restricted in shape and usage because of the necessity of being kept in the vacuumed state, so as to be troublesome to be practically utilizable.

There has been also developed a heat insulator having a thermal conductivity of 0.015 kcal/mhr°C. in the form of a rigid foamed urethane. In the case of this foamed urethane, however, the low thermal conductivity is solely dependent on the thermal conductivity of fluorocarbon gas (viz., 0.006 to 0.01 kcal/mhr°C.) sealed in respective foams, so that there have been such problems that the heat insulating properties will be deteriorated once a substitution of air for the fluorocarbon gas takes place during long term use, the deterioration after one year reaching such an extent that the thermal conductivity is elevated to be about 0.021 to 0.024 kcal/mhr°C.

DISCLOSURE OF THE INVENTION

It is accordingly the object of the present invention to provide a fine porous member having thermal conductivity under atmospheric pressure which is remarkably lower than that of stationary air and which has a small variability with time.

In the present invention, the above object can be attained by providing a method for manufacturing a fine porous member showing a high heat insulation by molding a fine particle powder, wherein an ultrafine particle powder is employed at least for part of the fine particle powder, and the ultrafine particle powder is preliminarily subjected to a surface treatment for preventing cohesion.

According to the method for manufacturing the fine porous member of the present invention, the ultrafine particle powder is formed through a molding after the surface treatment to lower its cohesiveness. The amount of vacant space between respective particles of the ultrafine particle powder is reduced to a large extent via the molding.

In a preferred embodiment, the invention provides for a method for forming a fine porous member having low thermal conductivity which includes the steps of obtaining a quantity of ultrafine particle powder through a dry process carried out at a temperature above about 1,600° C.; maintaining the ultrafine particle powder thus obtained at a temperature above about 150° C.; treating the ultrafine particle powder with a surface treatment agent through a gas phase reaction to substantially remove surface cohesiveness, the ultrafine particle powder having a particle size from about 1 nm to about 20 nm; and combining the treated ultrafine particle powder with a quantity of fine particle powder to thereby form a mixture, the amount of fine particle powder in the mixture being from 0 to less than 75 wt.%, the fine particle powder having a particle size of from about 20 to about 10,000 nm.

BRIEF DESCRIPTION OF THE DRAWINGS

For a full and complete explanation of the invention, the following detailed description should be read in conjunction with the drawings, wherein.

DESCRIPTION OF THE PREFERRED EMBODIMENTS

While the present invention shall now be explained with reference to a best mode for working the invention, it should be appreciated that the intention is not to limit the invention only to such mode explained, but to rather include all alterations, modifications and equivalent arrangements possible within the scope of the appended claims.

In developing the fine porous member of the present invention, the inventors have noticed that the thermal conductivity of any porous member in general is dependent normally on the thermal conductivity of the gas (usually air) which is contained in the vacant space within the porous member in addition to the thermal conductivity of the solid portions of the member. Thus, the thermal conductivity under atmospheric pressure of the porous member can be made remarkably lower than that of stationary air to improve the heat insulating properties by rendering the vacant space within the porous member to be finely small for reducing the influence of the thermal conduction of air.

Figure 2:
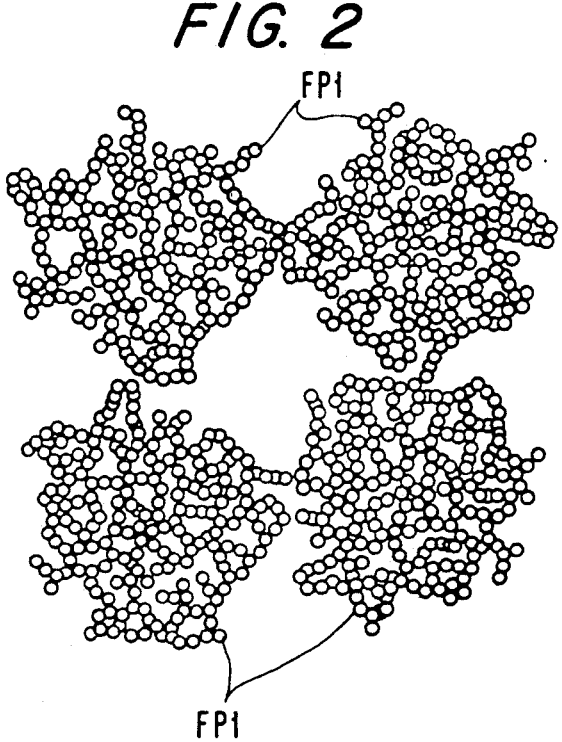
FIG. 2 is a diagram showing in a schematic model the structure of the ultrafine particles before being subjected to the surface treatment.

In rendering the vacant space in the porous member to be finely small so that the thermal conductivity under atmospheric pressure may be made remarkably below the conductivity of stationary air, it has been known to obtain a fine porous member by means of an ultrafine particle powder of a grain size of 1 to 20 nm or preferably 3 to 8 nm. When the ultrafine particle powder is integrally molded without any pretreatment, the powder shows a tendency to form large multiplex particles as shown in FIG. 2, due to the cohesiveness of the ultrafine particle powder, and it is therefore difficult to reduce the size of the vacant space in the porous member. In the present invention, therefore, a surface treatment is carried out with respect to the ultrafine particle powder for lowering or removing its cohesiveness, thereby reducing the tendency of the particles to form larger particles. This in turn allows reduction in the size of the vacant space.

When, for example, ultrafine particle silica is employed as the ultrafine particle powder, a larger number of silanol OH groups are present on the surface of such silica, so that the mutual bond strength between the particles due to hydrogen bonding will be high, and the particles will easily cohere together. The ultrafine particle silica also readily adsorbs aerial water molecules so that the thermal conductivity varies with time.

Figure 1:
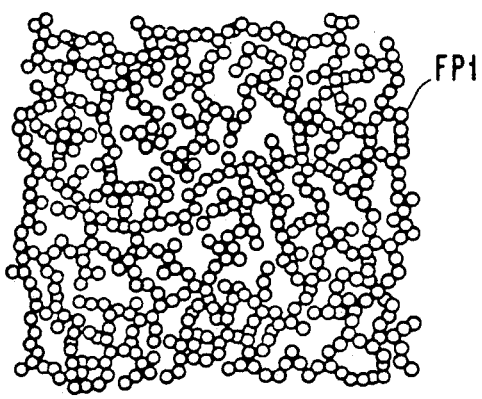
FIG. 1 is a diagram showing in a schematic model the fine porous member employing the ultrafine particle powder according to the method of the present invention.

A cohesion preventive treatment is, therefore, carried out through a gas phase reaction with respect to the ultrafine particle silica prepared by means of a dry process carried out at a high temperature above about 1600° C. in a state immediately after being prepared in which the amount of OH of the silanol group is small, that is, in a state of maintaining the high temperature of the dry process, so that the silica particles will be retained to be mutually not in bond state until they are formed into the porous member. Thereafter the ultrafine particles FP1 are subjected to a molding under a pressure as shown in FIG. 1.

Figure 3:
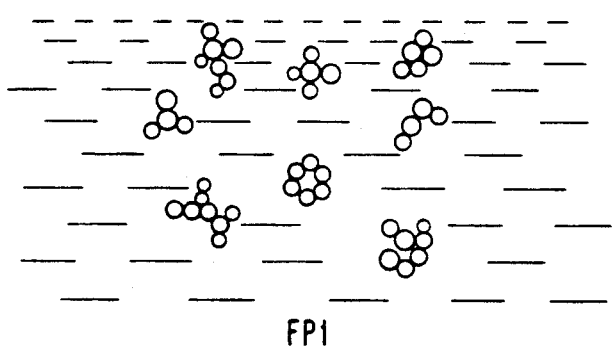
FIG. 3 is a diagram showing in a schematic model a state in which the ultrafine particles are dispersed in a solvent for their surface treatment by means of a liquid phase reaction.
Figure 4:
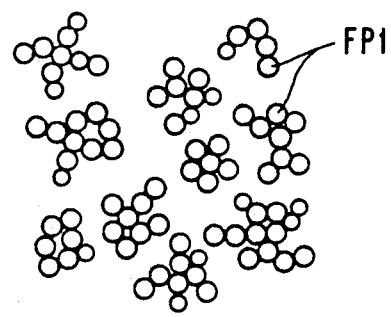
FIG. 4 is a diagram showing also in a schematic model a structure of the ultrafine particles after being subjected to the surface treatment.

In an event where a liquid phase reaction is utilized for the surface treatment of such ultrafine particles as the ultrafine particle silica, the ultrafine particles FP1 which have cohered as shown in FIG. 2 are first dipped in a solvent bath to have them dispersed in the bath as shown in FIG. 3. The ultrafine particles FP1 are then surface-treated with a surface-treating agent added to the bath which is optimumly heated to cause the reaction to take place, and the particles are dried to obtain cohesion-free ultrafine particles FP1 through the surface treatment, as shown in FIG. 4. For the surface-treating agent, there can be enumerated such organic silane compounds which react with the silanol group as alkoxysilane compounds including trimethylmethoxysilane, dimethyldiethoxysilane, methyltrimethoxysilane and the like, chlorosilane compounds including dimethyldichlorosilane, trimethylchlorosilane, triphenylchlorosilane and the like, silazane compounds including hexamethyldisilazane, dimethyltrimethylsilylamine and the like, while not required to be limited to them. For carrying out the surface-treating solvent in the liquid phase reaction, further, any one in which the ultrafine particles can easily disperse may be employed, and benzene, toluene and the like will be enumerated though not required to be limited thereto.

Figure 5:
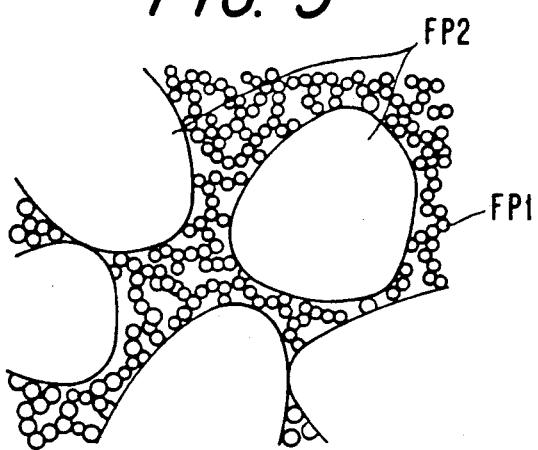
FIG. 5 is a diagram showing in a schematic model a fine porous member in another embodiment of the present invention formed by employing powders of fine and ultrafine particles of different grain size.

While in the foregoing an example of forming the finely porous member by means of the ultrafine particles FP1 has been shown, it has been found that a simultaneous use of fine particles FP2 of ordinary grain size with the ultrafine particles FP1 as shown in FIG. 5 is also extremely effective. Here, the fine particles of the ordinary grain size should be of the size in a range of 20 to 10,000 nm or ones which behave as if of the same size as being multiplex particles.

When the fine porous member is formed only with the fine particles FP2, there will be produced vacant space reaching 15% of average grain size of the fine particles FP2 even when a state close to the most dense charge is attained. However, a simultaneous use of the ultrafine particles FP1 which are surface-treated and of a grain size of 1 to 20 nm, preferably 3 to 8 nm, will result in that, as seen in FIG. 5, the ultrafine particles FP1 enter between the respective fine particles FP2 which are relatively larger in the grain size during the manufacture of the porous member, so that the vacant space within the porous member can be made finely small to be less than several nm. Mixing amount of the fine particles FP2 should preferably be less than 75 wt%, while considered more optimum if it is made less than 50 wt%.

For the fine particles FP2 larger in grain size, there may be enumerated various fine particles of such materials as crushed pearlite or silasballoon, cordierite, such inorganic layered compound as clay or the like, diatomaceous earth, calcium silicate, carbon black, silicon carbide (SiC), titanium dioxide ($TiO_2$), zirconium dioxide ($ZrO_2$), chromium dioxide ($CrO_2$), ferrosoferric oxide ($Fe_3O_4$), cupric sulfide (CuS), cupric oxide (CuO), manganese dioxide (MnO$_2$), silicon dioxide (SiO$_2$), aluminum oxide (Al$_2$O$_3$), cobaltous oxide (CoO), lithium oxide (Li$_2$O), calcium oxide (CaO) and the like. These materials are respectively high in emissivity, and the ones having an emissivity of more than 0.8 in the infrared region of the wave length more than 3 μm should preferably be employed.

With the use of such fine particles high in emissivity, the radiation energy in the particular fine particles can be converted into heat by a radiation-transmitted heat. And this heat is, on the other hand, only permeable and not retainable in the case of the ultrafine particles. Therefore, said energy converted into heat will be made not permeable through the fine particles. As the radiation energy is once converted into the heat energy, any heat transmission due to the radiation can be restrained, and the heat insulation at higher temperature is considered to be thereby further improved. The fine particles FP2 are of course not required to be limited to those of high emissivity, but such ones of a grain size of about 20 to 10,000 nm as the ultrafine particle silica not surface-treated will suffice the purpose intended in the present invention.

Further, a fibrous material may be mixed with the foregoing ultrafine or fine particles, for the purpose of improving the fine porous member in its handling properties. For the fibrous material to be mixed, such inorganic or organic fibrous materials as ceramic fiber, glass fiber, rock wool fiber, asbestos fiber, carbon fiber, polyamide fiber and the like may be enumerated. The fibrous material should preferably be added in an amount of less than 20% with respect to the weight of the particles. For the size of the fibrous material, a fiber diameter of less than 30 μm is preferable while the one of 5 μm is more preferable, and a fiber length of less than 50 mm is preferable.

In manufacturing the fine porous member, there may be enumerated such methods of obtaining the fine porous member by a known pressure molding, or charging the same powder particles in the space to be heat-insulated, while not required to be limited to them.

The use of the ultrafine silica particles as the ultrafine particles as has been disclosed is preferable in view of the easiness of availability or inexpensiveness, while also not required to be limited thereto. For the ultrafine silica particles, there may be enumerated the one obtained through a dry process by means of hydrolysis at a high temperature within a vapor phase of a volatile compound of silicon, in particular, its halogen compound, or a wet process of causing the member precipitated by an acid from a solution of alkali metal silicate, in particular, of sodium silicate, while any one by any other process may be employed. In any event, the one having a grain size after the surface treatment is in such range of 1 to 20 nm or preferably in a range of 3 to 8 nm may be effectively employed.

For the surface treatment, it may be possible to adopt, for example, a liquid phase treatment in which the ultrafine particles are dispersed within a solvent to have them reacted with a surface-treating agent added as promoted by a heating, reflux or the like, but it is more desirable to employ a gas phase treatment in which the surface-treating agent is applied to the ultrafine particles in an inert gas atmosphere and at a high temperature for the reaction, preferably above 150° C. and more desirably in a range of 250°-400° C.

The following examples illustrate the invention. It is to be understood, however, that the invention is not to be limited by the specific embodiments encompassed by these examples.

EXAMPLE 1

Ultrafine silica particles surface-treated by hexamethyldisilazane at 350° C. (custom-made by TOKUYAMA SODA K.K., grain size after the surface treatment about 8 nm, a specific surface 280 m$^2$/g) were pressure-molded under a molding pressure of 20 kgw/cm$^2$, and a sample of the fine porous member was obtained.

EXAMPLE 2

The same ultrafine silica particles surface-treated as in EXAMPLE 1 and ceramic fiber (a product SC Bulk #111 by SHIN-NITTETSU KAGAKU K.K., of a diameter 2.8 μm, and 50 mm long) were mixed together at a weight ratio of 20:1, by means of a high speed mixer (at about 3000 rpm) and were thereafter pressure-molded under a molding pressure of 20 kgw/cm$^2$, and a sample of the fine porous member was obtained.

EXAMPLE 3

The particles of EXAMPLE 1 as first particles and TiO$_2$ rutile powder as second particles (a product FR-41 by FURUKAWA KOGYO K.K.) were mixed together at a weight ratio of 3:1, by means of a high speed mixer (at about 3000 rpm) and were thereafter pressure-molded under a molding pressure of 20 kgw/cm$^2$, and a sample of the fine porous member was obtained.

COMPARATIVE EXAMPLE 1

Except for the use of dry-processed ultrafine silica particles (a product AEROSIL 380 by NIPPON AEROSIL K.K., grain size about 7 nm) in place of the surface-treated fine silica particles of EXAMPLE 1, a sample of the fine porous member was obtained in the same manner as in EXAMPLE 1.

COMPARATIVE EXAMPLE 2

Except for the use of dry-processed ultrafine silica particles (AEROSIL 380, grain size about 7 nm) in place of the surface-treated fine silica particles, a sample of the fine porous member was obtained in the same manner as in EXAMPLE 2.

COMPARATIVE EXAMPLE 3

Except for the use of dry-processed ultrafine silica particles (AEROSIL 380, grain size about 7 nm) in place of the surface-treated fine silica particles, a sample of the fine porous member was obtained in the same manner as in EXAMPLE 3.

The respective samples of the fine porous member obtained through the foregoing EXAMPLES 1 to 3 and COMPARATIVE EXAMPLES 1 to 3, and additionally the heat insulators on the market using porous silica gel (a product MICROTHERM by NIPPON AEROSIL K.K.) as COMPARATIVE EXAMPLE 4, were subjected to measurements of the thermal conductivity λ1 at standard state (temperature 25° C., humidity 65%) and of the thermal conductivity λ2 after a moistening test (for 48 hours at a temperature 60° C. and humidity 90%) in a manner based on ASTM-C518 with the use of a thermal conductivity measuring device of stationary method by EIKO SEIKI K.K., results of which measurements have been as shown in the following TABLE I:

TABLE I

| | Type of Particles | Therm. Cond. (kcal·mhr·°C) $\lambda 1$ | $\lambda 2$ |
|---|---|---|---|
| EX. 1 | Ultrafine silica particles treated by hexamethyldisilazane (abt. 8 nm) | 0.011 | 0.011 |
| EX. 2 | Ultrafine silica particles treated by hexamethyldisilazane (abt. 8 nm) + ceramic fiber | 0.012 | 0.012 |
| EX. 3 | Ultrafine silica particles treated by hexamethyldisilazane (abt. 8 nm) + TiO$_2$ rutile | 0.012 | 0.012 |
| COMP. EX. 1 | Ultrafine silica particles not treated (abt. 7 nm) | 0.014 | 0.041 |
| COMP. EX. 2 | Ultrafine silica particles not treated (abt. 7 nm) + ceramic fiber | 0.014 | 0.031 |
| COMP. EX. 3 | Ultrafine silica particles not treated (abt. 7 nm) + TiO$_2$ rutile | 0.015 | 0.041 |
| COMP. EX. 4 | Heat insulators on the market using porous silica gel | 0.016 | 0.043 |

It has been found from the above TABLE I that, with the use of a silane compound and with the cohesion preventing treatment made with respect to the ultrafine particle surface, the thermal conductivity of the ultrafine particles has been lowered while its water-vapor resistance has been improved so as not to cause the thermal conductivity elevated by any moisture.

Further examples have been carried out according to the present invention as will be referred to hereinafter:

EXAMPLE 4

Dry-processed ultrafine silica particles (a product AEROSIL 380 by NIPPON AEROSIL K.K. of an average grain size of about 7 nm) were dispersed and agitated in benzene, a benzene solution of hexamethyldisilazane (a product TSL 8802 by TOSHIBA SILICONE K.K.) was added to such dispersed solution as above, and they were mixed for 30 minutes. The mixture was kept being agitated for about two hours at reflux temperature 80° C. of benzene so as to cause a reaction carried out. Here, respective components were made to be of such weight ratio that the ultrafine silica particles:hexamethyldisilazane:benzene = 1:0.15:23. The thus reacted solution was dried at room temperature through vacuum drying, and was then subjected to a pressure molding, to obtain a sample of the fine porous member.

EXAMPLE 5

Except for that dry-processed silica particles produced by TOKUYAMA SODA K.K. of a specific surface of 480 m$^2$/g and an average grain size of 5 nm was employed at a weight ratio for the reaction of the ultrafine silica particles hexamethyldisilazane:benzene = 1:0.18:32, a sample of the fine porous member was obtained in the same manner as in EXAMPLE 4.

EXAMPLE 6

Ultrafine silica particles surface-treated by hexamethyldisilazane at 350° C. (custom-made by TOKUYAMA SODA, grain size after the surface treatment of about 7 nm, specific surface of 340 m$^2$/g) were pressure-molded under a molding pressure of 20 kgw/cm$^2$, and a sample of the fine porous member was obtained.

EXAMPLE 7

Ultrafine particles obtained through vacuum drying at room temperature of the reaction solution in the foregoing EXAMPLE 4 were mixed with fine particles of an average grain size of 100 nm obtained by crushing a pearlite (PEARLITE Type 1, FB, by UBE KOSAN K.K.) for 24 hours in a ball mill, at a weight ratio of 1:1, the mixture was pressure molded, and a sample of the fine porous member was obtained.

EXAMPLE 8

Ultrafine silica particles surface-treated by hexamethyldisilazane 350° C. (custom-made by TOKUYAMA SODA, grain size after the surface treatment of about 7 nm) and TiO$_2$ rutile powder (FR-41 by FURUKAWA KOGYO K.K.) were mixed at a weight ratio of 3:1, the mixture was pressure-molded under a pressure of 20 kgw/cm$^2$, and a sample of the fine porous member was obtained.

EXAMPLE 9

Ultrafine silica particles surface-treated by hexamethyldisilazane at 350° C. (custom-made by TOKUYAMA SODA, after-treatment grain size about 7 nm) and a copper oxide powder (by NAKARAI KAGAKU YAKUHIN K.K.) were mixed at a weight ratio of 3:1 and thereafter pressure-molded under a pressure of 20 kgw/cm$^2$, and a sample of the fine porous member was obtained.

EXAMPLE 10

Ultrafine silica particles surface-treated by hexamethyldisilazane at 350° C. (custom-made by TOKUYAMA SODA, after-treatment grain size about 7 nm), ferrosoferric oxide (a reagent by NAKARAI KAGAKU YAKUHIN) and carbon black (by NAKARAI KAGAKU YAKUHIN) were mixed at a weight ratio of 8:1:1 in a high speed mixer (about 3,000 rpm) and were then pressure-molded under a pressure of 20 kgw/cm$^2$, and a sample of the fine porous member was obtained.

EXAMPLE 11

To ultrafine silica particles surface-treated by hexamethyldisilazane at 350° C. (custom-made by TOKUYAMA SODA, after-treatment grain size about 7 nm), 5 wt% of ceramic fiber material (SC bulk #111 by SHINNITTETSU KAGAKU K.K. of a diameter 2.8 μm, 50 mm long) was added as reinforcing material, they were mixed as agitated by a high speed mixer at about 3,000 rpm and thereafter pressure-molded under a pressure of 20 kgw/cm², and a sample of the fine porous member was obtained.

EXAMPLE 12

Except that ultrafine silica particles (average grain size 5 nm) surface-treated by dimethyldichlorosilane at 350° C. (custom-made by TOKUYAMA SODA, after-treatment grain size 6 nm) was employed, a sample of the fine porous member was obtained in the same manner as in EXAMPLE 11.

EXAMPLE 13

Except that ultrafine silica particles (average grain size 5 nm) surface-treated by dimethyldichlorosilane at 350° C. (custom-made by TOKUYAMA SODA, after-treatment grain size 8 nm) was employed, a sample of the fine porous member was obtained in the same manner as in EXAMPLE 11.

EXAMPLE 14

Ultrafine silica particles surface-treated with hexamethyldisilazane at 350° C. (custom-made by TOKUYAMA SODA, after-treatment grain size about 7 nm), carbon black (by NAKARAI KAGAKU YAKUHIN) and ceramic fiber (SC bulk #111 by SHIN-NITTETSU KAGAKU, of a diameter 2.8 μm and 50 mm long) were mixed at a weight ratio of 3:1:0.5 as agitated by a high speed mixer at about 3,000 rpm, and thereafter pressure-molded under a pressure of 20 kgw/cm², and a sample of the fine porous member was obtained.

EXAMPLE 15

Except that an inorganic layered compound (a product of Na-montmorillonite, KUNIGEL-3V, by KUNIMINE KOGYO K.K.) was employed in place of carbon black and that a rock wool fiber (S fiber layered cotton by SHINNITTETSU KAGAKU of a diameter 4 μm and 30 to 40 mm long) was used in place of ceramic fiber, a sample of the fine porous member was obtained in the same manner as in EXAMPLE 14.

EXAMPLE 16

Ultrafine silica particles surface-treated with dimethyldichlorosilane at 350° C. (custom-made by TOKUYAMA SODA, after-treatment average grain size about 6 nm), TiO₂ rutile powder (FR-41 by FURUKAWA KOGYO) and carbon fiber (a product by NIPPON CARBON K.K. of a diameter 15 μm and 20 mm long) were mixed at a weight ratio of 3:1:0.2 and thereafter pressure-molded under a pressure of 20 kgw/cm², and a sample of the fine porous was obtained.

COMPARATIVE EXAMPLE 5

Ultrafine silica particles (AEROSIL 380 of average grain size about 7 nm) and finely crushed pearlite were mixed at a weight ratio of 3:1 and thereafter pressure-molded under a pressure of 20 kgw/cm², and a sample of the fine porous member was obtained.

COMPARATIVE EXAMPLE 6

Ultrafine silica particles (custom-made by TOKUYAMA SODA of average grain size 5 nm), TiO₂ rutile powder (FR-41 by FURUKAWA KOGYO) and ceramic fiber (SC bulk #111 by SHIN-NITTETSU KAGAKU) were mixed at a weight ratio of 3:1:0.2 and were thereafter pressure-molded under a pressure of 20 kgw/cm², and a fine porous member about 5 mm thick was obtained.

Measurements of the thermal conductivity were carried out with respect to the respective sample fine porous members obtained through EXAMPLES 4 to 16 and COMPARATIVE EXAMPLES 5 and 6, under the same conditions as in EXAMPLES 1 to 3 and COMPARATIVE EXAMPLES 1 to 4, and results were as in the following TABLE II:

TABLE II

| | Ultrafine Particle (FP1) | Fine Particle (FP2) | Fiber | Therm. Cond. (kcal/mhr °C.) |
|---|---|---|---|---|
| EX. 4 | AEROSIL 380 (abt. 7 nm) liq. ph. react. trt'd by hexamethyldisilazane | — | — | 0.012 |
| EX. 5 | Silica particles (abt. 5 nm) liq. ph. react. trt'd by hexamethyldisilazane (by TOKUYAMA SODA) | — | — | 0.011 |
| EX. 6 | Silica particles trt'd by hexamethyldisilazane (by TOKUYAMA SODA, abt. 7 nm) | — | — | 0.010 |
| EX. 7 | AEROSIL 380 (abt. 7 nm) liq. ph. react. trt'd by hexamethyldisilazane | Finely crushed pearlite | — | 0.013 |
| EX. 8 | Same as in EX. 6 | TiO₂ rutile | — | 0.011 |
| EX. 9 | Same as in EX. 6 | CuO | — | 0.010 |
| EX. 10 | Same as in EX. 6 | Fe₃O₄ + carbon black | — | 0.011 |
| EX. 11 | Same as in EX. 6 | — | Ceramic | 0.010 |
| EX. 12 | Silica particles trt'd by dimethyldichlorosilane (by TOKUYAMA SODA, abt. 6 nm) | — | Ceramic | 0.012 |
| EX. 13 | Silica particles trt'd by dimethyldichlorosilane (by TOKUYAMA SODA, abt. 8 nm) | — | Ceramic | 0.012 |
| EX. 14 | Same as in EX. 6 | Carbon black | Ceramic | 0.011 |

TABLE II-continued

|   | Ultrafine Particle (FP1) | Fine Particle (FP2) | Fiber | Therm. Cond. (kcal/mhr °C.) |
|---|---|---|---|---|
| EX. 15 | Same as in EX. 6 | Inorganic bedded comp. | Rock wool | 0.011 |
| EX. 16 | Same as in EX. 12 | TiO₂ rutile | Carbon | 0.012 |
| COMP. EX. 5 | AEROSIL 380 (abt. 7 nm) | Finely crushed pearlite | — | 0.015 |
| COMP. EX. 6 | Silica particles (by TOKUYAMA SODA, abt. 5 nm) | TiO₂ rutile | Ceramic | 0.014 |

It has been found that, as would be clear from the above TABLE II, the respective sample fine porous members of EXAMPLES 4 to 16 according to the present invention have shown a lower thermal conductivity than that of COMPARATIVE EXAMPLES 5 and 6, and favorable results could be attained.

EXAMPLE 17

Ultrafine silica particles prepared through the dry process and immediately thereafter surface-treated with hexamethyldisilazane in the gas phase reaction while being kept at 250° C. (custom-made by TOKUYAMA SODA K.K. for MATSUSHITA ELECTRIC WORKS, LTD., grain size before and after the surface treatment about 5 nm and about 7 nm, respectively) and ceramic fiber (a product SC Bulk #111 by SHIN-NIT-TETSU KAGAKU K.K., of a diameter 2.8 μm and a length 50 mm, as a reinforcing member) were mixed together by means of a high speed mixer (at about 3000 rpm) at a composition of the ceramic fiber to be 5 wt.% with respect to the surface-treated ultrafine silica particles, and were thereafter pressure-molded under a molding pressure of 20 kgw/cm², and a sample of the fine porous member was obtained.

COMPARATIVE EXAMPLE 7

Except that the ultrafine silica particles just prepared through the dry process were first preserved at room temperatures for one week and were thereafter surface-treated with hexamethyldisilazane, a sample of the fine porous member was obtained in the same manner as in EXAMPLE 17.

These two samples of the fine porous member obtained through these EXAMPLE 17 and COMPARATIVE EXAMPLE 7 were subjected to measurements of the thermal conductivity, results of which were as shown in following TABLE III:

TABLE III

|   | Type of Particles | Therm. Cond. (kcal/mhr °C.) |
|---|---|---|
| EX. 17 | Ultrafine silica particles (abt. 5 nm) held at 250° C. and surface-treated by hexamethyldisilazane in a gas phase (abt. 7 nm) + ceramic fiber | 0.010 |
| COMP. EX. 7 | Ultrafine silica particles (abt. 5 nm) left at room temps. and thereafter surface-treated by hexamethyldisilazane + ceramic fiber | 0.013 |

It is seen from the above that the fine porous member formed with the ultrafine silica particles prepared through the dry process and immediately surface-treated in the gas phase reaction without being cooled after the dry-processing but as maintained at the high temperature of, for example, 250° C. is excellent in heat insulation due to such lower thermal conductivity than that in the case where the ultrafine silica particles are once cooled before being surface-treated.

Further, three different test samples A, B and C of the fine porous member as the heat insulator have been prepared in such that:

A: Sample heat insulator of the ultrafine silica particles prepared as dry-processed and immediately surface-treated with hexamethyldisilazane in gas-phase reaction as kept at the high temperature of the dry-processing.

B: Sample heat insulator of the ultrafine silica particles prepared as dry-processed but not subjected to the surface treatment.

C: Sample heat insulator of the ultrafine silica particles prepared as dry-processed, once cooled down to room temperatures and thereafter surface-treated with hexamethyldisilazane in liquid-phase reaction in a bath of toluene at its reflux temperature of about 80° C.

These sample heat insulators A-C were pressure-molded commonly under 20 kgw/cm² and into a disk shape of 50 mm in diameter and 10 mm in thickness.

Figure 6:
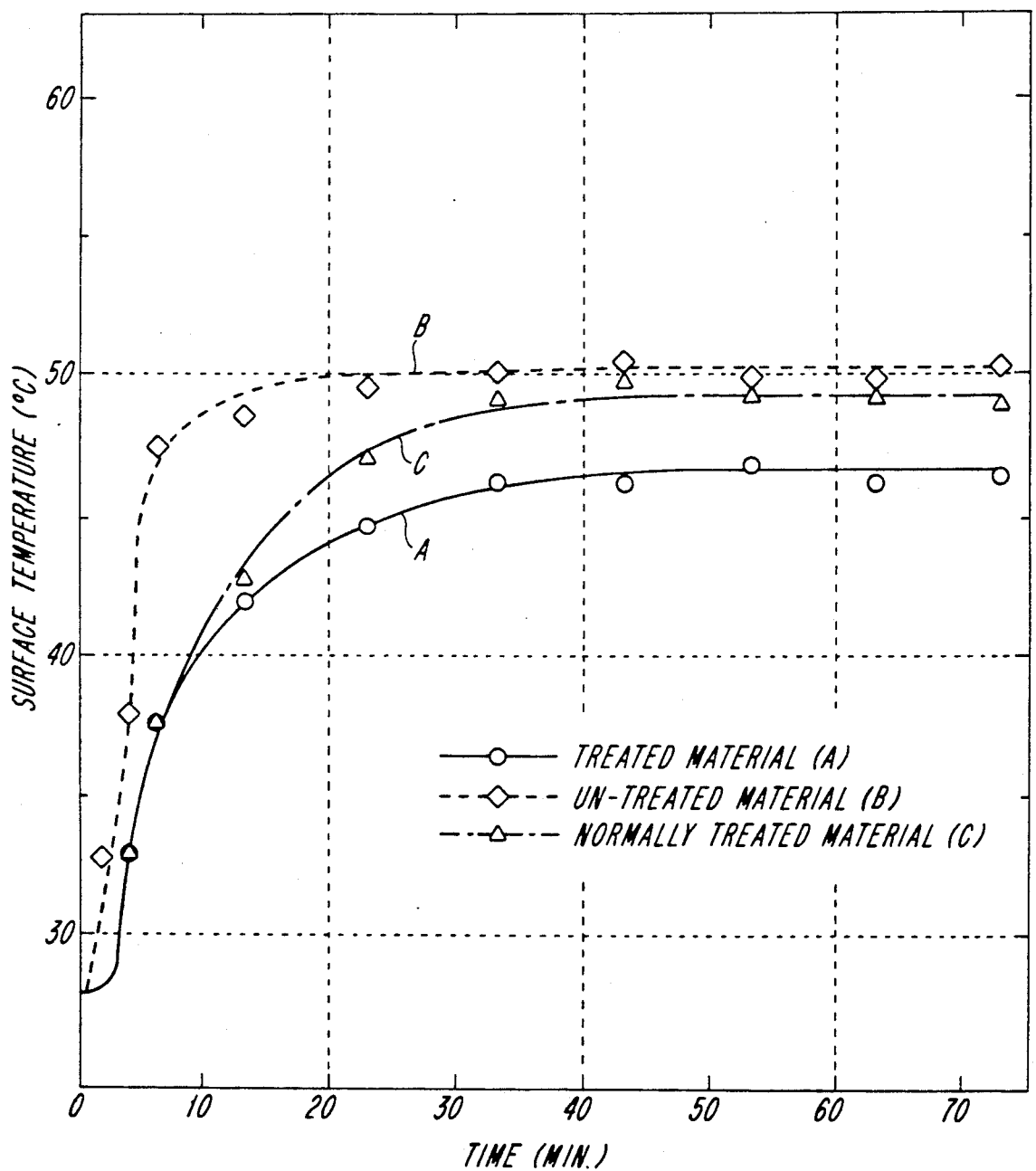
FIG. 6 is a graph providing plots of surface temperature vs. time for one embodiment of the porous member of the invention and prior art compositions.

The respective sample heat insulators A-C were subjected to thermographic measurement to appraise surface temperature of the samples, specifically surface temperature changes with time as diagrammatically presented in FIG. 6, by placing the samples A-C on an electric hot plate energized to have a surface temperature constantly of about 150° C. at a room temperature of about 28° C., while covering the respective samples with a thin vinyl chloride sheet in order to render the surface heat emissivity of the sample heat insulators A to C to be constant and also covering exposed surface area of the hot plate around the samples with a fibrous heat insulating member.

As seen in FIG. 6, the sample C cooled once and later surface-treated in the liquid phase shows remarkably less changes or increases in the surface temperature in comparison with the sample B not surface-treated at all within about 30 minutes after initiation of the heating but shows the maximum surface temperatures substantially of the same level as that of the sample B after about 30 minutes, whereas the sample A immediately surface-treated as kept hot and in the gas phase shows remarkably less surface temperature increase throughout the heating time in contrast to the sample B and even as compared with the sample C particularly after about 20 minutes after the initiation of the heating.

What we claim is:

1. A method for forming a fine porous insulating member having low thermal conductivity, comprising the steps of:

obtaining a quantity of ultrafine particle powder through a dry process carried out at a temperature above about 1,600° C.;

maintaining said quantity of ultrafine particle powder thus obtained at a temperature above about 150° C.;

treating said quantity of ultrafine particle powder maintained at said temperature of above about 150° C. with a surface treatment agent through a gas phase reaction to substantially remove surface cohesiveness, said ultrafine particle powder having a particle size of from about 1 nm to about 20 nm;

combining the treated ultrafine particle powder with a quantity of fine particle powder, thereby forming a mixture, the amount of fine particle powder in the mixture being less than 75 wt.%, said fine particle powder having a particle size of from about 20 to about 10,000 nm; and molding the mixture into a fine porous insulating member, the surface treatment agent rendering vacant spaces within the insulating member sufficiently small whereby the thermal conductivity of the insulating member is less than that of air.

2. A method of claim 1, wherein said ultrafine particle powder is maintained at a temperature of from about 250° C. to about 400° C. after said dry processing step.

3. A method of claim 1, which further comprises the step of pressure molding the mixture.

4. A method of claim 1, wherein the ultrafine particle powder comprises silica.

5. A method of claim 1, wherein the treatment step comprises treating the ultrafine particle powder with an organic silane or organic silazane.

6. A method of claim 5, wherein the treatment step comprises treating the ultrafine powder with at least one compound selected from the group consisting of hexamethyldisilazane and dimethyldichlorosilane.

7. A method of claim 1, including the step of adding to the mixture a quantity of fibrous material selected from the group consisting of ceramic fiber, glass fiber, rock wool fiber, asbestos fiber, carbon fiber and polyamide fiber in an amount less than 20 percent by weight with respect to the total weight of the fine and ultrafine particle powders.

8. A method of claim 1, wherein the fine particle powder is selected from the group consisting of crushed pearlite, silasballoon, cordierite, clay, diatomaceous earth, calcium silicate, carbon black, silicon carbide, titanium dioxide, zirconium dioxide, chromium dioxide, ferrosoferric oxide, cupric sulfide, cupric oxide, manganese dioxide, silicon dioxide, aluminum oxide, cobaltous oxide, lithium oxide, calcium oxide and combinations thereof.

* * * * *